United States Patent [19]
Filer

[11] 3,826,938
[45] July 30, 1974

[54] MAGNETIC COUPLING FOR MOTOR DRIVEN PUMPS AND THE LIKE

[75] Inventor: Burt K. Filer, Philadelphia, Pa.

[73] Assignee: Process Industries, Incorporated, Huntingdon Valley, Pa.

[22] Filed: Oct. 23, 1973

[21] Appl. No.: 408,721

Related U.S. Application Data

[63] Continuation-in-part of Ser. No. 262,739, June 14, 1972, abandoned.

[52] U.S. Cl. .............................. 310/104, 417/420
[51] Int. Cl. ........................................... H02k 49/06
[58] Field of Search ............ 310/93, 103, 104, 105; 417/420

[56] References Cited
UNITED STATES PATENTS

| | | | |
|---|---|---|---|
| 1,568,305 | 1/1926 | Williams | 310/104 |
| 1,724,873 | 8/1929 | Ford | 310/103 X |
| 1,982,971 | 12/1934 | Tabor | 310/104 X |
| 2,437,871 | 3/1948 | Wood | 310/103 |
| 2,481,172 | 9/1949 | Staggs | 310/104 X |
| 2,705,762 | 4/1955 | Pile | 310/104 |
| 2,898,485 | 8/1959 | Richter et al. | 310/104 |
| 2,970,548 | 2/1961 | Berner | 310/104 X |
| 3,520,642 | 7/1970 | Fulton | 417/420 |

Primary Examiner—D. F. Duggan
Attorney, Agent, or Firm—Zachary T. Wobensmith, 2nd; Zachary T. Wobensmith, III

[57] ABSTRACT

A magnetic drive coupling is disclosed which can be employed in motor driven pumps and for other purposes, which includes coupling members forming part of the magnetic circuit which can be isolated to prevent fluid communication therebetween and in which a plurality of stationary electrically activated flux sources are provided which also form part of the magnetic circuit and in which an improved flux path is provided.

8 Claims, 2 Drawing Figures

MAGNETIC COUPLING FOR MOTOR DRIVEN PUMPS AND THE LIKE

CROSS REFERENCE TO RELATED APPLICATION

This application is a continuation in part of my prior application filed June 14, 1972, Ser. No. 262,739, now abandoned.

BACKGROUND OF THE INVENTION

1. Field of the Invention

This invention relates to high performance magnetic couplings in which a fixedly mounted flux source is provided, the couplings being particularly suited for but not limited to use with motor driven pumps.

2. Description of the Prior Art

It has heretofore been proposed to provide couplings for driving fluid impellers which couplings employed permanent magnets with a gap therebetween. The arrangements heretofore employed had limited flux density and with high horsepower units difficulties occurred in starting due to inertia and slipping. With the structures of that type heretofore proposed, also, demagnetization occurred with ageing, thereby reducing the effectiveness of the coupling.

If the magnets of one component of the coupling were enclosed or encased this frequently resulted in a loss of part of the magnetic effect so as to reduce the available force.

In the U.S. Pat. to Fulton, Nos. 3,520,642 and 3,591,818 electromagnetic responsive couplings are shown for higher horsepower units but these have rotating flux sources which require conductor rings and brushes for energization of the flux sources.

Wood, in U.S. Pat. No. 2,437,871 shows a magnetic coupling in which a driving and a driven member are provided, each with a set of permanent magnets. No fixed housing with fixed electromagnetic flux sources therein are shown, with rotatable magnetic responsive members therein coupled in a flux path in series or with the flux path herein described.

Pile, in U.S. Pat. No. 2,708,762 shows a magnetic coupling with two telescoped driving members and an interposed seal cylinder but is lacking in any fixed housing having electromagnetic flux sources fixed therein.

Tabor, in U.S. Pat. No. 1,982,971, shows a magnetic coupling in which an outer rotatable element is provided for power input and carrying revolvable electromagnets energized through brushes and slip rings with an axially disposed magnetic responsive driven impeller. No fixed housing, nor fixedly mounted flux sources in the housing are shown and Tabor has an entirely different structural arrangement.

Berner, in U.S. Pat. No. 2,970,548, shows a magnetically driven pump in which a cup like rotatable magnet holder has a driven member telescoped therein. A sealing diaphragm is interposed. There is little resemblance between the magnetic circuit of this patent and that of applicant.

Richter, in U.S. Pat. No. 2,898,485, shows two forms of clutch each with a fixed source of magnetic flux in the form of permanent magnets having salient poles.

Staggs, in U.S. Pat. No. 2,481,172, shows axially disposed driving and driven elements of pancake type with an interposed isolating diaphragm. This structure is wholly unsuited for high power use and does not suggest any fixedly mounted electromagnetic flux sources nor a flux path utilizing such sources.

Sessions, in U.S. Pat. No. 700,839, shows a magnetic clutch in which two shafts end to end are provided supporting spiders each carrying pole pieces.

None of the Sessions structures have a fixed housing with input and output means at opposite ends of a fixed housing connected to rotatably mounted magnetic flux responsive means one within the other but isolated from fluid access therebetween and with a plurality of fixed electromagnetic flux source members disposed along the interior of the housing, nor any flux retention structure.

Williams, in U.S. Pat. No. 1,568,305, shows a magnetic clutch in which a fixed housing has stationary windings mounted therein. A driving shaft carries a driving coupling member into which a driven coupling member extends. A sealing shell is interposed between the coupling members. A single stationary winding provides a flux source and is disposed at one end of the housing offset from the teeth on the coupling members, the location at which coupling is effected, and a different relative disposition of the coupling members and the flux source.

Ford, in U.S. Pat. No. 1,724,272, shows a magnetic meter motor with a driving shaft connected to a driving rotor (see FIGS. 2 and 5). A driven rotor (see FIGS. 2 and 4) is in surrounding relation to a tube and receives flux through saliencies on its outer periphery. The permanent magnets, part of a continuous band, provide a flux source, and flux path which is not part of the housing.

Ford, in U.S. Pat. No. 1,724,873, shows a magnetic meter which is similar in many respects to the Ford U.S. Pat. No. 1,724,272, in its use of a single band permanent magnet which transfers flux to a driven rotor having a discontinuous periphery.

Graemiger, in Swiss Pat. No. 65,594, shows an electromagnetic coupling in which one coupling member is disposed within another with an isolating member interposed between and in which one of the coupling members is provided with electromagnetic coils. As shown in FIG. 1 energizing brushes and rings are provided for energization of the coils. FIG. 2 shows a somewhat different but related arrangement of the two rotatable coupling members, one of which carries the coils. In FIG. 4 an axial air gap or pancake arrangement of the coupling members is shown.

Graemiger does not have any fixed internal shaft nor any arrangement of the driving and driven components suggestive of the present invention.

SUMMARY OF THE INVENTION

In accordance with the invention a high performance magnetic coupling is provided having interacting rotating magnetic coupling components within a housing, one of the components being for power input and the other component being for power output, a fixedly mounted flux source in the housing having a plurality of stacked electromagnets as well as some permanent magnet characteristics, the flux source being provided in series magnetic circuit with the coupling elements and having provisions for smooth uninterrupted flux transfer to the coupling elements, with fluid isolation and shielding between the coupling components, the housing forming a part of the flux path and one of the coupling components being carried on a fixed shaft.

It is the principal object of the present invention to provide a magnetic coupling which is simple in construction and free from inertia effects and slipping in use.

It is a further object of the present invention to provide a high power magnetic coupling which is suitable for use for transmission of multiple horsepower.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
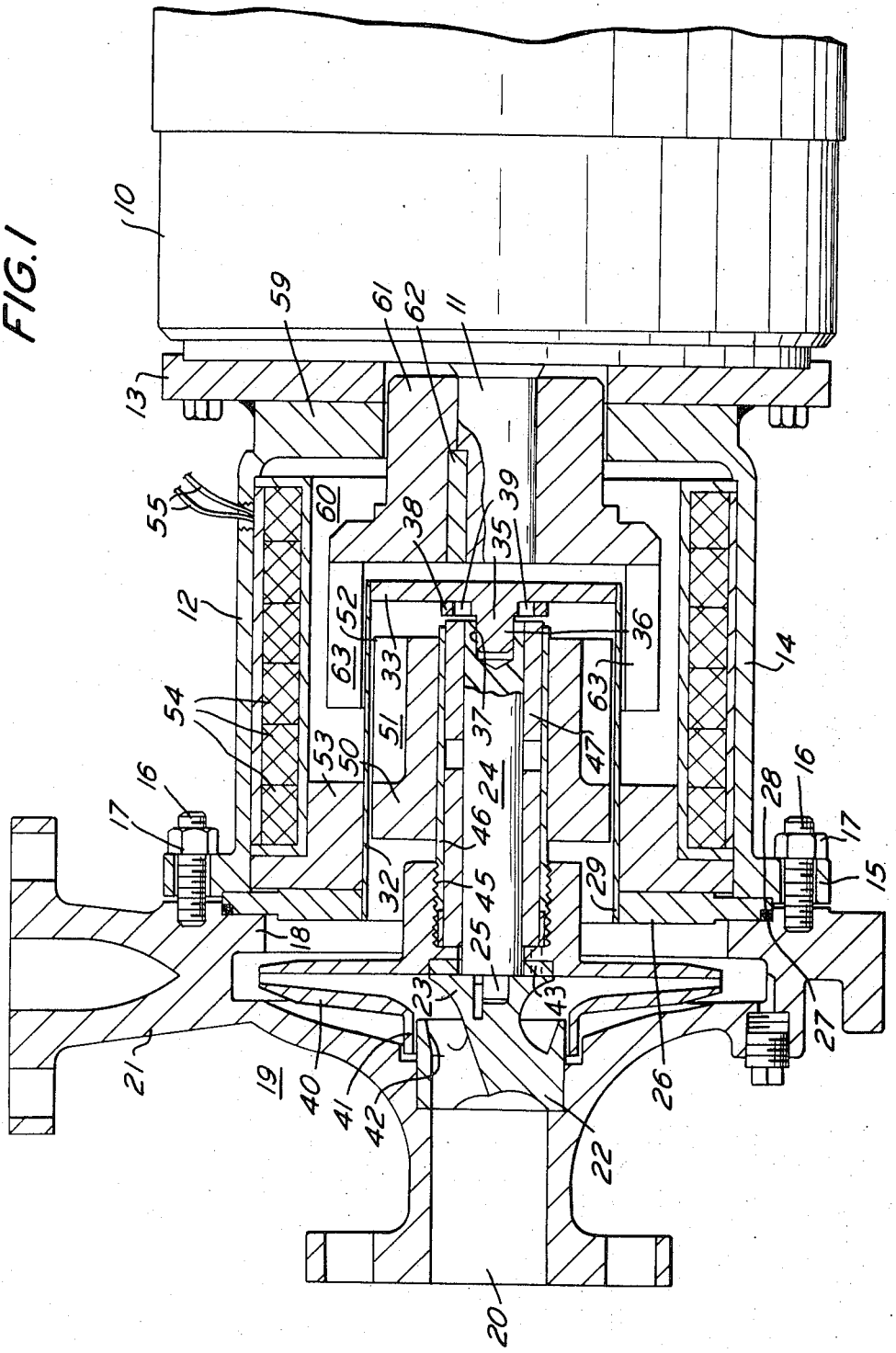
FIG. 1 is a longitudinal central sectional view of a motor driven pump having a magnetic coupling in accordance with the invention applied thereto.

It should, of course, be understood that the description and drawings herein are illustrative merely, and that various modifications and changes can be made in the structure disclosed without departing from the spirit of the invention.

DESCRIPTION OF A PREFERRED EMBODIMENT

Referring now more particularly to the drawings, an electric motor 10 is shown having a shaft 11 extending into an open end of a coupling housing 12 with an end flange 13 which can be secured to the housing of the motor 10 in any desired manner.

The coupling housing 12 has a generally cylindrical central portion 14 and an opposite end flange 15.

The end flange 15 has detachably secured thereto, such as by studs 16 and 17, the flange 18 of an impeller housing 19. The impeller housing 19 has a fluid inlet 20 and a scroll 21 of well known type with a fluid delivery connection (not shown).

The impeller housing 19 has mounted in the inlet 20 a spider 22 with a central boss 23 in which one end 25 of a fixedly mounted shaft 24 is keyed.

The flanges 15 and 17 have interposed therebetween a mounting plate 26, which may have a groove 27 therein for the reception of a packing 28, such as an O-ring, for preventing fluid leakage from the impeller housing 19 at this location.

The mounting plate 26 has a central opening 29 at which a cylindrical isolating sleeve 32 is secured in fluid tight relation, such as by welding. The other end of the sleeve 32 is closed by a plate 33, also preferably welded thereto. The sleeve 32 and plate 33 are preferably of non-magnetic responsive material, such as stainless steel.

The plate 33 has secured thereto, such as by welding, a fixed stub shaft 35. The stub shaft 35 has a cylindrical end portion 36, of reduced size, for engagement in a complemental opening 37 in the fixed shaft 24.

The stub shaft 35 also has a limit stop ring 38 fixed thereon with openings 39 for fluid circulation.

The impeller assembly includes a fluid impeller 40. The fluid impeller 40 has a cylindrical flange 41 for sliding movement with respect to a flange portion 42 on the spider 22. A thrust ring 43 can be provided in the impeller 40 for engagement with the inner end of the spider 22.

The impeller 40 is detachably secured, such as by threads 45 to a hollow sleeve shaft 46 which serves as an impeller mounting. A cylindrical bearing 47 is interposed between the rotatable shaft 46 and the fixed shaft 24.

Figure 2:
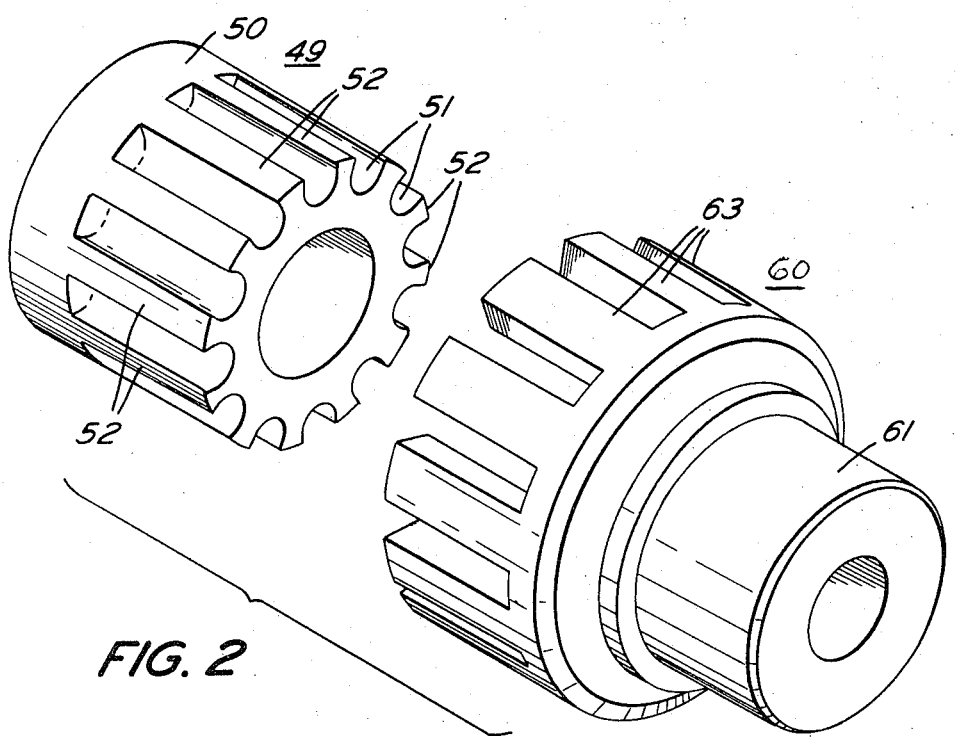
FIG. 2 is a view in perspective of the rotatable coupling components.

The sleeve shaft 46 preferably has mounted thereon and secured thereto, and within the isolating sleeve 32, a magnetic responsive unit 49, shown in detail in FIG. 2, which includes a collar portion 50 and extending longitudinally therefrom a longitudinally grooved portion 51 having a plurality of longitudinal axial pole pieces 52. The collar 50 has a small clearance with respect to the sleeve 32 to permit fluid circulation.

Within the housing 12 a fixed ring 53 is inserted, preferably of magnetic retentive material such as high carbon steel which extends outwardly along the mounting plate 26 and longitudinally axially along the exterior of the sleeve 32 and in surrounding relation to the collar portion 50 to provide part of the magnetic circuit and smooth flux transfer at this location.

The ring 53 has, in partial overlapping relation, a plurality of stacked annular windings 54 disposed longitudinally axially, with leads 55 connected to a direct current source for activation of the windings 54 to set up a magnetic field. The plurality of windings 54 by their interconnection provide the desired flux pattern and intensity and by their location are separated from materials being handled, such as high temperature fluids.

Disposed within the housing 12, also, a magnetic driving element 60 is provided. The magnetic element 60 includes a hub 61 keyed to the motor shaft 11 by a key 62. An end plate portion 59 of the housing 12, disposed outwardly along the end flange 15 provides a ring integral with the housing 12 in surrounding relation to the hub 61 and also provides part of the magnetic circuit for smooth flux transfer at this location.

The hub 61 has extending longitudinally axially therefrom, exteriorly of the sleeve 32, a plurality of separated pole pieces 63 which are radially outwardly of and in overlapping relation with respect to the pole pieces 52.

It will be noted that a magnetic flux path is provided which can be traced from the windings 54, through the ring 53, the collar 50, pole pieces 52, pole pieces 63, hub 61, plate portion 59 and flange 13, and central cylindrical portion 14 to the windings 54.

The parts which enter into the magnetic circuit can be of any desired magnetic material, such as soft iron, steel, high intensity metallic materials or ceramic material subject to strength limitations, but it is preferred that at least one part of the magnetic circuit such as the fixed ring 53, be of high carbon steel to retain some permanent magnetism to aid in starting by keeping some alignment.

The number and arrangement of pole pieces 52 and 63 can be varied in accordance with particular design requirements.

The mode of operation will now be pointed out.

A fixed source of flux is available by energization of the windings 54 through leads 55 from a suitable source of electric energy for setting up a high magnetic intensity flux which follows the flux path previously described.

Rotation of the shaft 11 of the motor 10 is effective to rotate the magnetic driving element 61. The pole pieces 62 are effective through the isolating sleeve 32 on pole pieces 52, in a series flux path, to effect rotation of the sleeve shaft 46 for actuation of the desired device to be driven. The sleeve shaft 46 is shown as being connected to the fluid impeller 40 for delivery of fluid from the fluid inlet 20, through the scroll 21 to the fluid outlet (not shown).

Fluid from the scroll 21 can circulate within the interior of the isolating sleeve 32 by access of the fluid to the windings 54 and structure within the housing 12 but outside the sleeve 32 is prevented without the use of glands or similar packing structures.

I claim:
1. A coupling comprising
    a fixed housing having inwardly extending rings at each end thereof
    flux source means fixedly mounted in said housing and comprising a plurality of annular electromagnets longitudinally axially disposed in said housing and in a series flux path with both said rings,
    rotary power input means at one end of said housing,
    rotary power take-off means at the other end of said housing,
    magnetic fluix responsive means rotatably mounted in said housing and within said flux source means and connected to said power input means,
    magnetic flux responsive means rotatably mounted in said housing and within said flux source means and connected to said power take-off means,
    one of said flux responsive means being disposed within the other,
    each of said flux responsive means including a cylindrical mounting portion with a plurality of pole pieces extending longitudinally axially therefrom in said housing,
    the pole pieces of one of said flux responsive means being radially outwardly disposed with respect to the pole pieces of the other of said flux responsive means in at least partial overlapping relation,
    the cylindrical mounting portion of one of said flux responsive means being radially inwardly of one of said rings and forming therewith a continuation of said flux path,
    the cylindrical mounting portion of the other of said flux responsive members being radially inwardly of the other of said rings and completing said series flux path.
2. A coupling as defined in claim 1 in which
    a fluid isolating sleeve member is interposed between said flux responsive means.
3. A coupling as defined in claim 1 in which
    a fixedly mounted shaft is provided in said housing, and one of said flux responsive means is supported by said shaft.
4. A coupling as defined in claim 3 in which
    a fluid isolating sleeve member is interposed between said flux responsive means,
    said sleeve has an end closure, and
    one end of said fixedly mounted shaft is carried by said end closure.
5. A coupling as defined in claim 1 in which
    one of said rings is integral with said housing and provides an end closure therefor.
6. A coupling as defined in claim 1 in which one of said rings is mounted within said housing.
7. A coupling as defined in claim 1 in which
    at least part of said flux path is of a material having flux retention qualities.
8. A coupling as defined in claim 6 in which
    said ring is of a material having flux retention properties.

* * * * *